3,770,736
Patented Nov. 6, 1973

3,770,736
SUBSTITUTED-s-TRIAZINES
Humio Kobayashi and Hiroshi Sakata, Kyoto, Takesi Mizoguti, Hirakata, Akio Sasaki, Uji, and Isuyoshi Nakamura, Kyoto, Japan, assignors to Unitika Kabushiki Kaisha, Amagasaki, Japan
No Drawing. Application July 2, 1970, Ser. No. 52,061, which is a continuation-in-part of abandoned application Ser. No. 718,263, Apr. 2, 1968. Divided and this application Aug. 24, 1971, Ser. No. 174,528
Claims priority, application Japan, Apr. 11, 1967, 42/22,566; Sept. 16, 1967, 42/59,306, 42/59,307, 42/59,308; Sept. 18, 1969, 42/59,696, 42/59,697; Dec. 15, 1967, 42/80,363; Jan. 11, 1968, 43/1,491
Int. Cl. C07d 55/12, 55/18, 55/20
U.S. Cl. 260—249.8         12 Claims

ABSTRACT OF THE DISCLOSURE

Novel 2,4,6-trisubstituted-s-triazine derivatives containing sulfonate groups are used to improve the dyeability of synthetic linear polyamides, whereby the dyeability of the polyamides by basic dyestuffs is enhanced, while at the same time the dyeability by acid dyestuffs is inhibited. The s-triazines are incorporated in the polyamide by adding them to either a polyamide-forming reactant or directly to the synthetic linear polyamide. The modified polyamide can be further processed in the conventional manner.

CROSS-REFERENCE TO RELATED APPLICATIONS

This is a division of co-pending application, Ser. No. 52,061, filed July 2, 1970, which in turn is a continuation-in-part of application Ser. No. 718,263, filed Apr. 2, 1968, now abandoned.

BACKGROUND OF THE INVENTION

This invention relates to novel 2,4,6-trisubstituted-s-triazine derivatives and their use for increasing the affinity of polyamides for basic dyestuffs.

Synthetic linear polyamides (hereinafter designated as polyamides) have, in general, the disadvantage of being poorly dyeable by basic dyestuffs. It is therefore desirable to enhance their dyeability for basic dyestuffs. On the other hand, polyamides which are resistant to acid dyestuffs are also desirable.

Various attempts have been proposed for the purpose of improving the dyeability of polyamides. In one such process, the polyamide is added with a large amount of a suitable viscosity-stabilizing agent having an acid radical such as for example sebacic acid. Unfortunately, it is difficult to enhance the affinity of polyamides for basic dyestuffs, which at the same time inhibit the affinity for acid dyestuffs by this process.

In another process, the polyamide is treated with a suitable agent such as for example γ-butyrolactone and an N-acylamide during the spinning operation in order to improve its dyeability. Although the obtained polyamide has an inhibited dyeability for acid dyestuffs, the affinity for basic dyestuff is not enhanced.

It has also been proposed to improve the dyeabilities of polyamides by using either a suitable mono- or dibasic acid containing a benzene ring substituted with a sulfonate radical, or a suitable diamine. The sulfonated compounds of this type, however, have the disadvantage in that they can only be added to the polyamide during the polymerization step and can not simply be used in the spinning step.

We have now found that the dyeability of synthetic linear polyamides by basic dyes can be significantly enhanced by incorporating within the polyamide various novel 2,4,6-trisubstituted-s-triazine derivatives which contain sulfonate groups.

SUMMARY OF THE INVENTION

This invention comprises novel substituted-s-triazine derivatives of the formula:

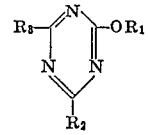

where $R_1$ can be phenyl, nitrophenyl, chlorophenyl, acetophenyl, lower alkyl substituted phenyl, biphenyl and naphthyl; and $R_2$ can be $-NH-R_4-(SO_3^1/mM)_n$, $-NR_5-R_4-(SO_3^1/mM)_n$
$-O-R_4-(SO_3^1/mM)_n$, and $-R_4-(SO_3^1/mM)_n$ where $R_4$ is an aromatic radical having a valence of $(n+1)$ of up to 20 carbon atoms, and alkylene of up to 6 carbon atoms, $R_5$ is alkyl of up to 5 carbon atoms, M is an alkali metal, an alkaline earth metal or manganese, $n$ is 1 or 2, except that $n$ is 1 when $R_4$ is alkylene;

$m$ is 1 when M is an alkali metal and 2 when M is an alkaline earth metal or manganese; and $R_3$ can be OH, $OR_1$ and $R_2$.

This invention also comprises a process for producing triazine derivatives of the formula:

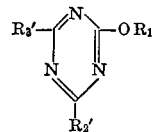

where $R_1$ is as defined above, $R_2'$ is:

$-NH-R_4-(SO_3M_1)_n$, $-NR_5-R_4(SO_3M_1)_n$, and
$-O-R_4-(SO_3M_1)_n$ where $R_4$, $R_5$ and $n$ are as previously defined, $M_1$ is Na, K, or Li, and $R_3'$ is $OR_1$ and $R_2'$;

where $R_1$ and $R_2'$ are as defined above.

The above compounds are prepared by contacting an aqueous suspension of a mole equivalent of cyanuric chloride with a one mole equivalent of a compound selected from each of the group consisting of $R_1OH$, $R_2'-H$, and $R_3'-H$, where $R_2'-H$ is:

$NH_2-R_4-(SO_3M_1)_n$, $NHR_5-R_4-(SO_3M_1)_n$, or
$HO-R_4-(SO_3M_1)_n$, in the presence of at least one inorganic base selected from the group consisting of $(M_1)_2 O_3$ and $M_1OH$, at a temperature between about 0° and 20° C.; and separating the triazine derivatives from the reaction mixture.

This invention also provides a process for preparing triazine derivatives of the formula:

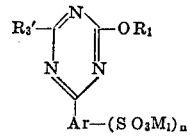

where Ar is an aromatic radical having a valence of $(n+1)$ of up to 20 carbon atoms and the other groups are as previously defined hereinabove. These compounds are prepared by contacting a compound having the formula:

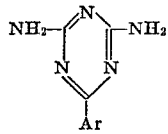

where Ar is as defined above, with sulfuric acid or oleum; hydrolyzing the amino groups of the sulfonated product to hydroxy groups. The hydroxy groups are converted to chloro groups by contacting the compound with a chlorinating agent selected from the group consisting of phosphorus trichloride, phosphorus pentachloride and thionyl chloride. The 2,4-dichloro-s-triazine is then contacted in an aqueous suspension with a mole equivalent of a compound selected from each of the groups $R_1OH$ and $R_3'$—H. The pH of the aqueous mixture is adjusted to neutral with mineral acid; and the product is separated from the reaction mixture.

Another object of the present invention is to provide a process for enhancing the dyeability of synthetic linear polyamides for basic dyestuff.

Further object of the present invention is to provide a process for enhancing the dyeability of synthetic linear polyamides for basic dyestuff with the inhibition of the dyeability thereof for acid dyestuff.

The present invention also comprises a process for improving the dyeabilities of synthetic linear polyamides for basic and acid dyestuffs, comprising the steps of adding to a synthetic linear polyamide having terminal amino groups or a polyamide-forming reactant, a triazine derivative of the formula above and heating the resulting mixture to react the triazine compound with the polyamide or polyamide-forming reactant.

The present invention also provides a process for improving the dyeabilities of synthetic linear polyamides for basic and acid dyestuffs which comprises adding a triazine derivative of the formula given hereinabove, and a diamine, to a polyamide-forming reactant, and heating the resulting mixture to effect polymerization.

Synthetic linear polyamides obtained by the process of the present invention exhibit an enhanced dyeability for basic dyestuff and an inhibited dyeability for acid dyestuff in comparison with those of the conventional synthetic linear polyamides and moreover give no deteriorative influence upon advantageous characteristics thereof such as favourable mechanical and chemical properties.

DETAILED DESCRIPTION OF THE INVENTION

The majority of the novel triazine derivatives of the present invention are prepared by reacting an aqueous suspension cyanuric chloride with the appropriate hydroxy- or primary or secondary amino- compound in a basic aqueous medium. The reaction scheme is outlined below:

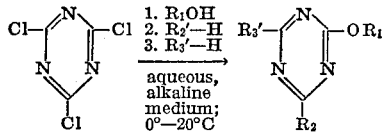

$R_1$=phenyl, nitrophenyl, chlorophenyl, acetophenyl, lower alkyl substituted phenyl, biphenyl, and naphthyl
$R_2'$=—NH—$R_4$—$(SO_3M_1)_n$; —$NH_5$—$R_4$—$(SO_3M_1)_n$ and —O—$R_4$—$(SO_3M_1)_n$
$R_4$ is an aromatic radical having a valence of $(n+1)$ of up to 20 carbon atoms, and alkylene of up to 6 carbon atoms
$R_5$ is alkyl of up to 5 carbon atoms
$M_1$ is Na, K, or Li
$n=1$ or 2; except $n$ is 1 when $R_4$ is alkylene
$R_3'$=$OR_1$ and $R_2'$.

Reaction schemes similar to the above have previously been reported in the literature. See J. Am. Chem. Soc., 73, 2981, 2984, 2986, 2990, 2992, 2996, 3004, and 3007 (1951), and J. Chem. Soc. Japan-Ind., Chem. Sect., 68, 714 (1965).

In the above reaction, the compounds $R_1$—OH, $R_2'$—H, and $R_3'$—H are added to an aqueous suspension of cyanuric chloride, generally at a temperature of from 0°–20° C.; preferably at from 0°–10° C. The pH of the aqueous medium is kept below about 9 with base, preferably at a pH between 7–8. Although organic bases such as pyridine and the trialkylamines can be used, we prefer to use inorganic bases, in particular, the hydroxides, carbonates, and bicarbonates of the alkali metals. The inorganic bases of the alkaline earth metals and manganese can be used as well; however, because of their availability and convenience in handling, the alkali metal bases are preferred.

The order of addition of the reactants $R_1$—OH, $R_2'$—H, and $R_3'$—H is not critical. As shown above, $R_3'$—H can be $R_1$—OH or $R_2'$—H, and in most cases $R_3$—H will be identical with $R_1$—OH or $R_2'$—H. In this situation, there will be only 2 reactants to add, viz., $R_1$—OH and $R_2'$—H, although, of course there will be twice as much of one as the other. Nevertheless, this has no effect upon the manner of addition, and either reactant can be added first.

After the addition of the last reactant, the pH of the aqueous medium is brought to neutral (pH 7) with acid, usually a dilute mineral acid, and the mixture heated to effect complete solution, and allowed to cool. When $R_4$ is arylen, the final product is usually difficult to filtrate from the alkaline solution after the addition of the last reactant. However, it has been found that this problem can be avoided if the pH of the mixture is made neutral and treated as described. In this manner only the desired triazine derivatives crystallizes from the solution. The inorganic salts remain in the mother liquor. Generally, the triazine derivatives thus obtained are of sufficient purity to be used in the process of the present invention; however, they may be recrystallized further from water if desired.

In some instances where $R_4$ is alkylene, the alkali salt of the triazine derivative may be appreciably water soluble. In this case, the preferred isolation technique is to salt out the triazine derivative with an alkali metal chloride having the same cation as the triazine derivative (sulfonate salt). The triazine derivative can be isolated from any chloride salt by taking it up in an organic solvent and filtered free of alkali metal chloride.

The triazine derivatives having the substituents —$OR_1$, —$R_2'$, and $R_3$=—OH can be readily prepared by reacting cyanuric chloride with one mole equivalents of each of $R_1$—OH, and $R_2'$—H, as described hereinabove, followed by alkaline hydrolysis of the remaining chloro group to the hydroxy group. A similar hydrolysis reaction has been reported in J. Syn. Org. Chem.—Japan 18, 175 (1965).

Compounds of the present invention where $R_2$ is —$R_4$—$(SO_3\ 1/mM)_n$, that is wherein —$R_4$— is directly attached to the s-triazine ring, can be prepared by a variety of synthetic procedures. Compounds where —$R_4$— is an aromatic radical can be prepared from the Friedel-Crafts reaction of cyanuric chloride with the appropriate hydrocarbon, using a Lewis acid such as aluminum chloride. See for example J. Syn. Org. Chem.—Japan, 25, 55, 60 (1967) and J. Chem. Soc.—Japan—Ind. Chem. Sect., 68, 714 (1965). The 2-aryl-4,6-dichloro s-triazine is then sulfonated with a conventional sulfonating system such as concentrated sulfuric acid or oleum.

The sulfonated product is then reacted with $R_1$—OH and $R_3'$—H as described above. Again, —OH can be introduced on the triazine ring ($R_3$=—OH) by alkaline hydrolysis of a ring-bound chloro group as previously described.

Aryl groups and alkyl groups can also be introduced on the triazine ring by a Grignard reaction as described in Hel. Chim. Acta, 33, 1368 (1950), wherein $R_4MgBr$ is treated with cyanuric chloride. Either 1 or 2 chlorine groups can be replaced by this method. The product is then sulfonated and further reacted as illustrated above to give the desired product.

We have also developed a general method for preparing novel compounds of the present invention containing the group —Ar—$(SO_3M_1)n$ on the triazine ring, where Ar is an aromatic radical having a valence of $(n+1)$ of up to 20 carbon atoms. In this process, the Ar group of a compound below, such as benzoguanamine (Ar=phenyl):

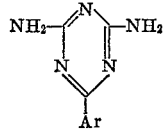

is sulfonated. The 2,4-diamine groups are hydrolyzed to —OH groups by treatment with alkali, and these in turn are replaced with chloro groups by treatment with a chlorinating agent such as thionyl chloride, phosphorus trichloride, or phosphorus pentachloride. The 2,4-dichloro-6-sulfoaryl-s-triazine is then reacted in the manner previously described to give the desired compounds.

While the novel compounds of the present invention comprise the alkali metal, alkaline earth metal and manganese salts of the sulfonated 2,4,6-trisubstituted-s-triazines, as indicated above, they are generally isolated as the alkali metal salts for the reasons previously given. If desired, the analogous alkaline earth and manganese bases can be used in the preparation of these compounds and the alkaline earth and manganese salts can be attained directly. Nevertheless, it is preferred to prepare these salts from the corresponding alkali metal salts, particularly the sodium and potassium salts. This is conveniently accomplished by heating them in aqueous solutions with various water soluble alkaline earth and manganese salts, such as the nitrates, chlorides and lower carboxylates, e.g. the acetates. The lithium salts are usually also prepared from the sodium and potassium salts this way.

The novel compounds of the present invention can be used to enhance the dyeability of synthetic linear polyamides by basic dyes, while at the same time inhibiting the dyeability by acid dyestuffs.

The term "synthetic linear polyamides" in this specification indicates any and all synthetic linear polyamides of the known types and can be exemplified as follows:

Homopolyamides and copolyamides such as polycaproamide (nylon 6), poly-hexamethylene adipamide (nylon 66), nylon 4, nylon 7, nylon 610, poly-hexamethylene isophthalamide, copolyamide of nylon 6/nylon 66 and copolyamide of nylon 66/polyhexamethylene isophthalamide.

Compounds which may be used as the polyamide-forming reactant according to this procedure include monomeric reactants and prepolymers derived therefrom capable of forming polyamides.

The monomeric reactants capable of forming polyamides include: (a) amino acids and their derivatives, (b) substantially equimolecular proportions of diamines or their derivatives and dicarboxylic acids or their derivatives.

Examples of amino acids include: 6-aminocaproic acid, 7-aminoheptanoic acid, 8-aminooctanoic acid, 9-aminononanoic acid, 10-aminodecanoic acid, 11-aminoundecanoic acid and 12-aminododecanoic acid.

Typical diamines include ethylene diamine, hexamethylene diamine, nonamethylene diamine and p-phenylene diamine. And useful dicarboxylic acids include for example adipic acid, sebacic acid, azelaic acid and isophthalic acid.

Examples of amide-forming derivatives of amino acids include their esters, anhydrides and amide lactam such as ε-caprolactam and δ-enanthlactam. Examples of amide forming derivatives of diamines are carbamates and N-formyl derivatives, and examples of amide forming derivatives of dicarboxylic acids are their esters, anhydrides and amides.

In case the combined use of both diamine and dicarboxylic acid are employed, it is preferred to use the reaction product in the salt form. It is, of course, also possible to use mixtures of two or more monomeric compounds.

Prepolymers prepared from such monomers and having lower molecular weights than those of the final polyamides can be used.

The radical $R_1O$ is assumed to be an ester derived from a cyanuric acid radical and hydroxylic radical of the phenol type, and at elevated temperature is capable of reacting with an amino group present in the polyamide-forming reactant or in polyamide itself as follows:

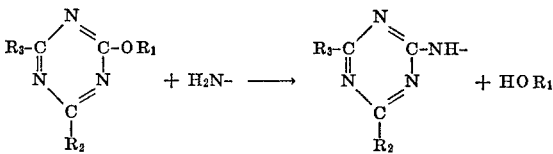

wherein $R_1$, $R_2$, and $R_3$ are as defined above.

The reaction of the radical $R_1O$ with the polyamide-forming reactant or with polyamide itself as shown above proceeds very quickly. On the other hand, the reaction of the radical $R_2$ with the amino group of these substances proceeds very slowly so that the radical $R_2$ seems to be substantially inactive with these substances, even though the reaction may proceed with different speeds depending upon the types of reactants and groups.

It has also been found that the radical $R_3$ can be either reactive or inactive with the polyamide-forming reactant or with the polyamide according to the selection of the radical which may be used as $R_3$. For example, the reaction may proceed rapidly when $R_3$ is $OR_1$, but very slowly when $R_3$ is OH. $R_3$ appears to be substantially inactive when $R_3$ is $R_2$.

The novel triazine derivatives of the present invention which may be used for the purpose of the present invention include, but are not limited to, the following compounds:

2,4-diphenoxy-6-[p-(sodiumsulfo) phenylamino]-s-triazine;

2,4-diphenoxy-6-[p-(potassiumsulfo) phenylamine]-s-triazine;

2,4-diphenoxy-6-[p-(lithiumsulfo) phenylamino]-s-triazine;

2,4-diphenoxy-6-[p-(magnesiumsulfo) phenylamino]-s-triazine;

2,4-diphenoxy-6-[p-(calciumsulfo) phenylamino]-s-triazine;

2,4-diphenoxy-6-[p-(bariumsulfo) phenylamino]-s-triazine;

2,4-diphenoxy-6-[p-(manganesesulfo) phenylamino]-s-triazine;

2,4-diphenoxy-6-[2',4'-bis (sodiumsulfo) phenylamino]-s-triazine;

2,4-diphenoxy-6-[2',4'-bis (lithiumsulfo) phenylamino]-s-triazine;

2,4-diphenoxy-6-[2'-methyl-4'-(sodiumsulfo) phenylamino]-s-triazine;

2,4-diphenoxy-6-[p-(sodiumsulfo) phenoxy]-s-triazine;

2,4-diphenoxy-6-[p-(potassiumsulfo) phenoxy]-s-triazine;

2,4-diphenoxy-6-[p-(lithiumsulfo) phenoxy]-s-triazine;

2,4-diphenoxy-6-[2',4'-bis (sodiumsulfo) phenoxy]-s-triazine;

2,4-diphenoxy-6-[2',4'-bis (magnesiumsulfo) phenoxy]-s-triazine;

2,4-diphenoxy-6-[3'-(sodiumsulfo) phenyl]-s-trazine;
2,4-diphenoxy-6-[3'-(manganesesulfo) phenyl]-s-triazine;
2,4-diphenoxy-6-[3',5'-bis (sodiumsulfo) phenyl]-s-triazine;
2,4-diphenoxy-6-[2'-methyl-5'-(potassiumsulfo) phenyl]-s-triazine;
2,4-bis (p-nitrophenoxy)-6-[p'-(sodiumsulfo) phenylamino]-s-triazine;
2,4-bis (p-nitrophenoxy)-6-[p'-(lithiumsulfo) phenylamino]-s-triazine;
2,4-bis (p-nitrophenoxy)-6-[p'-(calciumsulfo) phenylamino]-s-triazine;
2,4-bis (p-nitrophenoxy)-6-[2',4'-bis (magnesiumsulfo) phenoxy]-s-triazine;
2,4-bis (p-nitrophenoxy)-6-[2'-methyl-4'-(sodiumsulfo) phenoxy]-s-triazine;
2,4-bis (p-nitrophenoxy)-6-[3'-(calciumsulfo) phenyl]-s-triazine;
2,4-bis (p-nitrophenoxy)-6-[3',5'-bis (magnesiumsulfo) phenyl]-s-triazine;
2,4-bis (p-nitrophenoxy)-6-[2'-methyl-5'-(sodiumsulfo) phenyl]-s-triazine;
2,4-bis (p-phenylphenoxy)-6-[p'-(sodiumsulfo) phenylamino]-s-triazine;
2,4-bis (p-phenylphenoxy)-6-[2',4'-bis (potassiumsulfo) phenoxy]-s-triazine;
2,4-bis (p-phenylphenoxy)-6-[3',5'-bis (manganesesulfo) phenyl]-s-triazine;
2,4-bis (p-methylphenoxy)-6-[2'-ethyl-4'-(magnesiumsulfo) phenylamino]-s-triazine;
2,4-bis (p-methylphenoxy)-6-[2'-methyl-4'-(calciumsulfo) phenoxy]-s-triazine;
2,4-bis (p-methylphenoxy)-6-[3'-magnesiumsulfo) phenyl]-s-triazine;
2,4-bis (p-acetophenoxy)-6-[p'-(potassiumsulfo) phenoxy]-s-triazine;
2,4-bis (p-acetophenoxy)-6-[p'-(sodiumsulfo) phenylamino]-s-triazine;
2,4-bis (p-acetophenoxy)-6-[3'-(bariumsulfo) phenylamino]-s-triazine;
2,4-bis (2',4'-diethylphenoxy)-6-[2'',4''-bis (sodiumsulfo) phenoxy]-s-triazine;
2,4-bis (2',4'-diethylphenoxy)-6-[3''-(potassiumsulfo) phenyl]-s-triazine;
2,4-bis (β-naphthoxy)-6-[p-(sodiumsulfo) phenylamino]-s-triazine;
2,4-bis (β-naphthoxy)-6-[3'-(sodiumsulfo) phenyl]-s-triazine;
2,4-bis (β-naphthoxy)-6-[3'-(calciumsulfo) phenyl]-s-triazine;
2,4-bis (p-chlorophenoxy-6-[p'-(lithiumsulfo) phenylamino]-s-triazine;
2,4-bis (p-chlorophenoxy)-6-[2',4'-bis (potassiumsulfo) phenoxy]-s-triazine;
2,4-bis (p-chlorophenoxy)-6-[2'-ethyl-5'-(manganesesulfo) phenyl]-s-triazine;
2-phenoxy-4,6-bis [p-(sodiumsulfo) phenylamino]-s-triazine;
2-phenoxy-4-[3'-(potassiumsulfo) phenyl]-6-[p-(potassiumsulfo) phenylamino]-s-triazine;
2-phenoxy-4,6-bis [p-(lithiumsulfo) phenylamino]-s-triazine;
2-phenoxy-4,6-bis [p-(potassiumsulfo) phenylamino]-s-triazine;
2-phenoxy-4,6-bis [p-(lithiumsulfo) phenoxy]-s-triazine;
2-phenoxy-4,6-bis [p-(sodiumsulfo) phenoxy]-s-triazine;
2-phenoxy-4,6-bis [p-(bariumsulfo) phenoxy]-s-triazine;
2-phenoxy-4-[3'-(potassiumsulfo) phenyl]-6-[p-(potassiumsulfo) phenoxy]-s-triazine;
2-phenoxy-4,6-bis [2',4'-bis (sodiumsulfo) phenoxy]-s-triazine;
2-phenoxy-4,6-bis [2'-ethyl-4'-(lithiumsulfo) phenoxy]-s-triazine;
2-phenoxy-4,6-bis [3'-(sodiumsulfo) phenyl]-s-triazine;
2-phenoxy-4,6-bis [3'-(magnesiumsulfo) phenyl]-s-triazine;
2-phenoxy-4,6-bis [3',5'-bis (potassiumsulfo) phenyl]-s-triazine;
2-(p-nitrophenoxy)-4,6-bis [p'-(potassiumsulfo) phenylamino]-s-triazine;
2-(p-phenylphenoxy)-4,6-bis [2',4'-bis (potassiumsulfo) phenoxy]-s-triazine;
2-(p-methylphenoxy)-4,6-bis [2'-ethyl-5'-(potassiumsulfo) phenyl]-s-triazine;
2-(p-acetophenoxy)-4,6-bis [p'-(manganesesulfo) phenylamino]-s-triazine;
2-(2',4'-dimethylphenoxy)-4,6-bis [p-(magnesiumsulfo) phenylamino]-s-triazine;
2-(β-naphthoxy)-4,6-bis [p-(lithiumsulfo) phenoxy]-s-triazine;
2-phenoxy-4-[p-(t-butyl) phenoxy]-6-[3'-(potassiumsulfo) phenyl]-s-triazine;
2-phenoxy-4-[3'-(magnesiumsulfo) phenyl]-6-[p-(magnasiumsulfo) phenylamino]-s-triazine;
2-phenoxy-4-[p-(t-butyl) phenoxy]-6-[3'-(bariumsulfo) phenyl]-s-triazine;
2-phenoxy-4-[p-(t-butyl) phenoxy]-6-[p'-(potassiumsulfo) phenylamino]-s-triazine;
2-phenoxy-4-(p-methyl phenoxy)-6-[p'-(manganesesulfo) phenylamino]-s-triazine;
2-phenoxy-4-(p-nitrophenoxy)-6-[N-methyl-(β-lithiumsulfo) ethylamino]-s-triazine;
2-(p-acetophenoxy)-4-hydroxy-6-[3',5'-bis (lithiumsulfo) phenyl]-s-triazine;
2-phenoxy-4-hydroxy-6-[p-(sodiumsulfo) phenylamino]-s-triazine;
2-phenoxy-4-hydroxy-6-[p-(sodiumsulfo) phenoxy]-s-triazine;
2-phenoxy-4-hydroxy-6-[3'-(magnesiumsulfo) phenyl]-s-triazine;
2-[p-(t-butyl) phenoxy]-4-hydroxy-6-[p'-(sodiumsulfo) phenylamino]-s-triazine;
2-[p-(t-butyl) phenoxy]-4-hydroxy-6-[p'-(sodiumsulfo) phenoxy]-s-triazine;
2-(β-naphthoxy)-4-hydroxy-6-[p-(lithiumsulfo) phenylamino]-s-triazine;
2-(p-phenyl phenoxy)-4-hydroxy-6-[3'-(maganesesulfo) phenyl]-s-triazine;
2-(p-acetophenoxy)-4-hydroxy-6-[3'-(potassiumsulfo) phenyl]-s-triazine;
2,4-diphenoxy-6-[N-methyl-p-(sodiumsulfo) phenylamino]-s-triazine;
2,4-diphenoxy-6-[N-methyl-p-(calciumsulfo) phenylamino]-s-triazine;
2,4-bis (p-nitrophenoxy)-6-[N-methyl-p-(lithiumsulfo) phenylamino]-s-triazine;
2,4-diphenoxy-6-[β-(potassiumsulfo) ethylamino]-s-triazine;
2,4-diphenoxy-6-[β-(sodiumsulfo) ethylamino]-s-triazine;
2,4-diphenoxy-6-[β-(sodiumsulfo) ethoxy]-s-triazine;
2,4-diphenoxy-6-[4-(sodiumsulfo) naphthylamino]-s-triazine; and
2,4-diphenoxy-6-[γ-(sodiumsulfo) propylamino]-s-triazine.

According to the present invention, the triazine derivative can be added to the polyamide-forming reactant prior to polymerization or directly to the synthetic linear polyamide. The triazine derivatives can also be added to a polyamide-forming reactant during the polymerization.

The triazine derivative can be added to the polyamide-forming reactant alone, or if desired together with a diamine in an amount substantially equimolecular to the triazine derivative, and the polymerization performed at an elevated temperature in a conventional manner.

Diamines which may be used together with the triazine derivatives include, for example, aliphatic or aromatic diamines and can be exemplified by ethylene diamine, hexamethylene diamine, nonamethylene diamine, and diamines represented by the following formula:

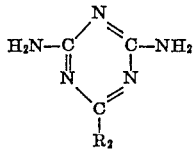

wherein $R_2$ is the same as defined above.

When the triazine derivative is used alone, it appears to act additionally as a viscosity stabilizer. This case can be understood by referring to the water-catalyzed polymerization of $\epsilon$-caprolactam or to the melt polymerization of hexamethylene diammonium adipate (66 salt) using acetic acid or sebacic acid as the viscosity stabilizer. In such case, the added amount of the triazine derivative according to the present invention is from 0.03 to 5 molar percent (preferably from 0.1 to 3 molar percent) based on polyamide-forming monomeric unit, which indicates one mole of amino-carboxylic acid or the combination of one mole of diamine with one mole of dicarboxylic acid.

When the triazine derivative is incorporated with diamine, the combined components appear to be active for the copolymerization.

Various disadvantages, such as for example, decrease in the melting point and of crystallinity may be observed when the copolymerization is carried out at a large copolymerization ratio. Accordingly, it is therefore desirable to avoid an excessively large ratio. It should be used the combined component in an amount of not more than about 30 molar percent (preferably not more than 10 molar percent) of the copolymer.

It is also possible to use a prepolymer which is prepared by the reaction of the triazine derivative with diamine and which has an intermediate molecular weight.

The process of the present invention can be carried out by conventional polymerization techniques with respect to operation conditions such as temperature, pressure, apparatus and the like. The reactants are heated from 180° C. to 300° C. (preferably from 200° C. to 295° C.) so as to give to the polyamide a sufficiently high molecular weight and good physical and chemical properties. The reaction can be conducted under super-atmospheric, atmospheric, or subatmospheric pressures. Preferably the reaction is carried out in the absence of oxygen in an inert gas atmosphere. In order to remove phenolic compounds, which may be formed by the reaction of the triazine derivative with amino groups, it is desirable that the polymerization be carried out under a subatmospheric pressure and/or in a stream of nitrogen.

The amounts of the sulfonate radicals and the terminal amino groups in the polyamide chain can advantageously be controlled by means of reaction temperature, atmospheric humidity, period of the polymerization times, and variations in the amounts of the triazine derivative and polyamide-forming reactant used.

Alternatively, the triazine derivative can be added directly to the polyamide, which is then heated to carry out the reaction. In this case, the terminal amino groups of the polyamide chain react with the triazine derivative.

The addition of the triazine derivative to the polyamide is followed by the reaction of these substances at an elevated temperature, such as a temperature above the melting point of the polyamide.

The triazine derivative is preferably added to the polyamide after the completion of the polymerization by using an extruder. For example, pellets of the polyamide are well mixed with the triazine derivative and are then charged to the screw extruder. The mixture is heated to melt in the extruder and is then extruded through the spinning unit. The triazine derivative reacts with the terminal amino groups of the polyamide in this extruder. It is observed that the fibre made of the modified polyamide has improved dyeabilities superior to those of conventional polyamides.

It is also possible to add the triazine derivative to a molten polyamide in a melting vessel or to a molten polyamide in the polymerization vessel immediately after the completion of polymerization.

The amounts of sulfonate radicals and terminal amino groups in the polyamide can be controlled by means of various factors such as for example the amount of the triazine derivative used and the number of terminal amino groups in the raw polyamide, as well as by period of reaction times, reaction temperature, etc. Because one mole of the terminal amino group of the raw polyamide reacts with one mole of the $OR_1$ radical of the triazine derivative, it is necessary to use the triazine derivative in such an amount that the equivalent ratio of $OR_1$ radical to the amino group therein is from one to five. The polyamide to be treated by this procedure should contain the amino groups as terminal groups of the polyamide chain.

The polyamide obtained by the process of the present invention contains the sulfonate radical in the molecular chain and shows an enhanced affinity for basic dyestuffs and inhibited affinity for acid dyestuffs. In order to achieve optimum results the following point should be appreciated. It is preferred that the polyamide obtained by the process of the present invention contain about 0.02–0.2 milliequivalents of sulfonate radical per gram of the improved polyamide and to have the lowest possible concentration of terminal amino groups. The preferable concentration of the terminal amino group is from trace to 0.1 milliequivalents per gram of the obtained polyamide. The existence of an excessive amount of terminal amino groups may be permissible, however, as the concentration of the sulfonate radical in the polyamide increases. An excessive equivalent of sulfonate radical to that of the terminal amino group will bring better results such as for example the inhibition of the affinity for acid dyestuffs and enhanced affinity for basic dyestuffs. It is preferred that the ratio of sulfonate radical to the terminal amino group be more than about 1.3.

When $n$ of the triazine derivative is two, or when $R_3$ is $R_2$, a large amount of the sulfonate radical can be coupled with the polyamide chain. Thus in such case, even by using only a small amount of the triazine derivative the affinity of the polyamide for basic dyestuff can sufficiently be enhanced.

It is important for the purpose of the present invention that the triazine ring itself have a good affinity for basic dyestuffs.

The dyeabilities of the obtained polyamide may vary considerably depending upon the selection of the substance represented by M in the formula of the triazine derivatives. Better dyeabilities can be obtained by the use of an alkali metal.

In general, basic dyestuffs have the advantage of giving brilliant colours. Thus the polyamides obtained by the process of the present invention can be dyed in brilliant colours with basic dyestuffs. Since the dyeability of the polyamide of this invention is inhibited for acid dyestuffs, articles, such as fabrics, spun yarn, etc., made by the combined use of the polyamides of this invention with normal polyamides having a good dyeability for acid dyestuff, can be dyed by the use of suitable acid dyestuff to tone-on-tone. Such articles can also be cross-dyed in one dyeing bath containing acid and basic dyestuffs to achieve multi-colour effects.

Varieties of colour shades such as two colours, three colours, one colour and white, and two colours and white, can be attained by the cross dyeing technique. The details of the cross dyeing technique are reported in American Dyestuff Reporter, page 68, No. 24, Vol. 56 (1967) and ibid., page 97, No. 25, Vol. 56 (1967).

As previously described, the improved dyeabilities of the polyamide of this invention are excellent. The novel polyamides of this invention are important for the preparation of yarns and fabrics, having improved dyeabilities while they can also be used in various other applications for which synthetic linear polyamide have conventionally been used, e.g., bristles, films, moldings, etc. The polyamides of this invention can be used together with other substances such as delusterants, pigments, antioxidants and other modifying agents.

The following examples are provided to illustrate further the scope of the present invention; however, they should not be considered as limitations thereof.

In the examples below the ratio of dyeing bath to the material to be dyed, is kept at 50.1 (by weight). Percentages are based on the weight of material.

EXAMPLE 1

A solution of cyanuric chloride (185 g.) in hot acetone (400 ml.) is added gradually to a stirred mixture of water (300 g.) and crushed ice (300 g.). To the stirred suspension of cyanuric chloride thus obtained, there is added during one hour, a solution of sulfanilic acid (173 g.) and sodium carbonate (53 g.) in water (1000 ml.), while the temperature of the reaction mixture is maintained between 0° and 4° C. The mixture is stirred for further 10 minutes, and then a solution of sodium carbonate (53 g.) in water (200 ml.) is added gradually during 50 minutes to render the reaction mixture between pH 7 and 8.

A cold solution of phenol (188 g.) and caustic soda (84 g.) in water (2500 ml.) is added to above reaction mixture maintaining the temperature of the reaction mixture between 5° and 10° C. After the addition of the solution is complete, stirring is continued for a further 30 minutes. The pH of the reaction mixture is adjusted to neutral by adding dilute hydrochloric acid and then it is heated to dissolve the precipitate and allowed to stand over night. The 2,4-diphenoxy-6-[p-(sodiumsulfo) phenylamino]-s-triazine obtained, is filtered, washed with a small amount of water and dried at 110° C. for 5 hours.

It is dissolved in hot water and excess amount of methyl amine hydrochloric acid is added. Heating is continued for 10 minutes and needle crystals are obtained from the solution.

The observed values of elemental analysis of this compound were in good agreement with the theoretical values of 2,4-diphenoxy-6-[p-(methyl ammoniumsulfo) phenylamino]-s-triazine. According, it is proved that 2,4-diphenoxy-6-[p-(sodiumulfo) phenylamino]-s-triazine is obtained by the method mentioned above.

Calc. (percent): C, 56.64; H, 4.32; N, 15.01; S, 6.87.
Obs. (percent): C, 56.46; H, 4.55; N, 15.00; S, 6.73.

Using the above procedure and the appropriate starting compounds the following triazine derivatives are similarly prepared:

2,4-diphenoxy-6-[2′-methyl-4′-(sodiumsulfo) phenylamino]-s-triazine;
2,4-bis (p-nitrophenoxy)-6-[p-(sodiumsulfo) phenylamino]-s-triazine;
2,4-bis (p-methylphenoxy)-6-[2′-ethyl-4′-(sodiumsulfo) phenylamino]-s-triazine;
2,4-bis (p-acetoxphenoxy)-6-[3′-(sodiumsulfo) phenylamino]-s-triazine;
2,4-bis (p-acetoxphenoxy)-6-[p′-(sodiumsulfo) phenylamino]-s-triazine;
2,4-bis (p-nitrophenoxy)-6-[p′-(sodiumsulfo) phenylamino]-s-triazine;
2,4-bis (p-phenylphenoxy)-6-[p′-(sodiumsulfo) phenylamino]-s-triazine;
2,4-bis (p-acetophenoxy)-6-[p′-(sodiumsulfo) phenylamino]-s-triazine;
2,4-bis (β-naphthoxy)-6-[p-(sodiumsulfo) phenylamino]-s-triazine;
2,4-bis (p-chlorophenoxy)-6-[p′-sodiumsulfo) phenyl]-amino]-s-triazine;
2-phenoxy-4-[p-(t-butyl) phenoxy]-6-[p′-(potassiumsulfo) phenylamino]-s-triazine;
2-phenoxy-4-(p-nitrophenoxy)-6-[N-methyl-(β-sodiumsulfo) ethylamino]-s-triazine;
2,4-diphenoxy-6-[N-methyl-p-(sodiumsulfo) phenylamino]-s-triazine;
2,4-bis (p-nitrophenoxy)-6-[N-methyl-p-(sodiumsulfo) phenylamino]-s-triazine;
2,4-diphenoxy-6-[2′,4′-bis (sodiumsulfo) phenylamino]-s-triazine;
2,4-diphenoxy-6-[β-(sodiumsulfo) ethylamino]-s-triazine;
2,4-diphenoxy-6-[4-(sodiumsulfo) naphthylamino]-s-triazine; and
2,4-diphenoxy-6-[γ-(sodiumsulfo) propylamino]-s-triazine.

Using the above procedure the corresponding potassium and lithium salts are obtained when the carbonates and hydroxides of potassium and lithium are used respectively.

The lithium salts can also be prepared according to the following general procedure:

2,4-diphenoxy-6-[p - (sodiumsulfo) phenylamino]-s-triazine (91.6 g) is dissolved in 10% lithium chloride aq. solution. The resulting mixture is boiled for 10 minutes and cooled to room temperature. The precipitate is filtered and recrystallized from 95% ethanol. Then 2,4-diphenoxy-6-[p-(lithiumsulfo) phenoxy]-s-triazine is obtained.

EXAMPLE 2

A solution of cyanuric chloride (185 g.) in hot acetone (400 ml.) is added gradually to a stirred mixture of water (300 g.) and crushed ice (300 g.).

To the stirred suspension of cyanuric chloride thus obtained, there is added during one hour, a solution of sulfanilic acid (346 g.) and sodium carbonate (106 g.) in water (1000 ml.), while the temperature of the reaction mixture is maintained between 0° and 10° C. The mixture is stirred for a further 10 minutes, and then a solution of sodium carbonate (106 g.) in water (300 ml.) is added gradually during 2 hours to render the reaction mixture between pH 7 and 8.

A cold solution of phenol (94 g.) and caustic soda (42 g.) in water (1000 ml.) is added to above reaction mixture, maintaining the temperature of the reaction mixture between 10° C. and 15° C. After the addition of the solution stirring is continued for further 40 minutes.

The pH of the reaction mixture is controlled to neutral by adding dilute hydrochloric acid and then it is heated to dissolve the precipitate and allowed to stand overnight.

The 2-phenoxy-4,6-bis [p-(sodiumsulfo) phenylamino] s-triazine obtained is filtered, washed with a small amount of water and dried at 130° C. for 5 hours.

The following compounds are also obtained from the appropriate starting materials using the above procedure:

2-(p-nitrophenoxy)-4,6-bis [p′-(sodiumsulfo) phenyl amino]-s-triazine;
2-(p-acetoxyphenoxy)-4,6-bis [p-(sodiumsulfo) phenylamino]-s-triazine;
2-(2′,4′-dimethylphenoxy)-4,6-bis [p-(sodiumsulfo) phenylamino]-s-triazine; and
2-(p-methylphenoxy)-4,6-bis [p-(sodiumsulfo) phenylamino]-s-triazine.

The potassium and lithium salts are also prepared by using the corresponding potassium and lithium carbonates and hydroxides in the above reactions.

EXAMPLE 3

A solution of cyanuric chloride (185 g.) in hot acetone (400 ml.) is added gradually to a stirred mixture of water (300 g.) and crushed ice (300 g.).

To the stirred suspension of cyanuric chloride thus obtained, there is added during one hour, a solution of p-phenol sulfonic acid (174 g.) and sodium carbonate (53 g.) in water (1000 ml.), while the temperature of the reaction mixture is maintained between 0° C. and 5° C. The mixture is stirred for a further 10 minutes, and then a solution of sodium carbonate (53 g.) in water (150 ml.) is added gradually during one hour to render the reaction mixture between pH 7 and 8.

A cold solution of phenol (188 g.) and caustic soda (84 g.) in water (1000 ml.) is added to above reaction mixture, maintaining the temperature of the reaction mixture between 5° C. and 10° C. After the addition of the solution stirring is continued for further 40 minutes.

The pH of the reaction mixture is controlled to neutral by adding dilute hydrochloric acid and then it is heated to dissolve the precipitate and allowed to stand overnight.

The 2,4-diphenoxy-6-[p-(sodiumsulfo) phenoxy]-s-triazine obtained is filtered, washed with a small amount of water and dried at 110° C. for 5 hours.

The following compounds are also obtained from the appropriate starting materials by means of the above procedure:

2,4-diphenoxy-6-[2',4'-bis (sodiumsulfo) phenoxy]-s-triazine;
2,4-bis (p-nitrophenoxy)-6-[p'-(sodiumsulfo) phenoxy]-s-triazine;
2,4-bis (p-nitrophenoxy)-6-[2'-methyl-4'-(sodiumsulfo) phenoxy]-s-triazine;
2,4-bis (p-phenylphenoxy)-6-[2',4'-bis (sodiumsulfo) phenoxy]-s-triazine;
2,4-bis (p-methylphenoxy)-6-[2'-methyl-4'-(sodiumsulfo) phenoxy]-s-triazine;
2,4-bis (p-acetoxyphenoxy)-6-[p'-(sodiumsulfo) phenoxy]-s-triazine;
2,4-bis (2',4'-diethylphenoxy)-6-[2'',4''-bis (sodiumsulfo) phenoxy]-s-triazine;
2,4-bis (p-chlorophenoxy)-6-[2'',4''-bis (sodiumsulfo) phenoxy]-s-triazine;
2-phenoxy-4,6-bis [p-(sodiumsulfo) phenoxy]-s-triazine;
2-phenoxy-4,6-bis [2',4'-bis (sodiumsulfo) phenoxy]-s-triazine;
2-phenoxy-4,6-bis [2'-ethyl-4'-(sodiumsulfo) phenoxy]-s-triazine;
2-(p-phenylphenoxy)-4,6-bis [2',4'-bis (sodiumsulfo) phenoxy]-s-triazine;
2-(β-naphthoxy)-4,6-bis [p-(sodiumsulfo) phenoxy]-s-triazine; and
2,4-diphenoxy-6-[β-(sodiumsulfo) ethoxy]-s-triazine.

The potassium and lithium salts of the above compounds are obtained by using the respective potassium and lithium carbonates and hydroxides in the above reaction.

The lithium salts can also be prepared by reacting the sodium salts with lithium chloride in hot, aqueous solution.

EXAMPLE 4

0.5 moles of benzoguanamine is sulfonated with concentrated sulfuric acid in the conventional manner. The 2,4-diamino-6-[3'-(sulfo) phenyl]-s-triazine thus obtained is refluxed in 20% sodium hydroxide solution for about one hour. The reaction mixture is diluted with water and the pH adjusted to about 7 with dilute mineral acid. The 2,4-dihydroxy-6-[3'-(sulfo) phenyl]-s-triazine obtained is then reacted with thionyl chloride to give 2,4-dichloro-6-[3'-(sulfo) phenyl]-s-triazine. The latter compound is then reacted with phenol according to the procedure of Example 3 to give 2,4-diphenoxy-6-[3'-(sodiumsulfo) phenyl]-s-triazine.

The following compounds are similarly prepared from the appropriate starting materials:

2,4-diphenoxy-6[2'-methyl-5-(sodiumsulfo) phenyl]-s-triazine;
2,4-diphenoxy-6-[3',5'-bis(sodiumsulfo) phenyl]-s-triazine;
2,4-bis (p-nitrophenoxy)-6-[3'-(sodiumsulfo) phenyl]-s-triazine;
2,4-bis (p-nitrophenoxy)-6-[3',5'-bis (sodiumsulfo) phenyl]-s-triazine;
2,4-bis (p-nitrophenoxy)-6-[2'-methyl-5-sodiumsulfo) phenyl]-s-triazine;
2,4-bis (p-phenylphenoxy)-6-[3',5'-bis (sodiumsulfo) phenyl]-s-triazine;
2,4-bis (p-methylphenoxy)-6-[3'-(sodiumsulfo) phenyl]-s-triazine;
2,4-bis (2',4'-diethylphenoxy)-6-[3''-(sodiumsulfo) phenyl]-s-triazine;
2,4-bis (β-naphthoxy)-6-[3'-(sodiumsulfo) phenyl]-s-triazine; and
2-phenoxy-4,6-bis [3'-(sodiumsulfo) phenyl]-s-triazine.

The corresponding potassium and lithium salts of the above compounds can be prepared by using the potassium and lithium carbonates and hydroxides, instead of sodium carbonate and sodium hydroxide.

EXAMPLE 5

2-phenoxy - 4 - [p - (t-butyl) phenoxy]-6-[p'-(sodium sulfo) phenyl amino]-s-triazine is prepared by the following manner.

A solution of cyanuric chloride (185° g.) in hot acetone (400 ml.) is added gradually to a stirred mixture of water (300 g.) and crushed ice (300 g.). To the stirred suspension of cyanuric chloride thus obtained, there is added during one hour, a solution of sulfanilic acid (173 g.) and sodium carbonate (53 g.) in water (1000 ml.), while the temperature of the reaction mixture is maintained between 0° C. and 4° C. The mixture is stirred for further 10 minutes, and then a solution of sodium carbonate (53 g.) in water (200 ml.) is added gradually during 50 minutes to render the reaction mixture between pH 7 and 8.

A cold solution of phenol (94 g.) and caustic soda (41 g.) in water (1300 ml.) is added to above reaction mixture maintaining the temperature of the reaction mixture between 5° C. and 10° C.

After the addition of the solution is complete, stirring is continued for a further 30 minutes. There is, then, added a cold solution of p-t-butyl phenol (75 g.) and caustic soda (41 g.) in water (1000 ml.) and acetone (500 ml.) maintaining the temperature between 10° C. and 25° C. Stirring is continued for further 30 minutes. The pH of the reaction mixture is adjusted to neutral by adding dilute hydrochloric acid and then it is heated to dissolve the precipitate and allowed to stand overnight.

The 2-phenoxy-4-[p-(t-butyl) phenoxy]-6-[p'-(sodiumsulfo) phenyl amino]-s-triazine obtained, is filtered, washed with a small amount of water and dried at 110° C., for 5 hours.

The following compounds are also prepared according to the procedure above;

2-phenoxy-4-(p-aceto phenoxy)-6-[p-(sodiumsulfo) phenyl amino]-s-triazine
2-phenoxy-4-(p-nitro phenoxy)-6-[p-(sodiumsulfo) phenyl amino]-s-triazine
2-phenoxy-4-(p-methyl phenoxy)-6-[p-(sodiumsulfo) phenyl amino]-s-triazine
2-phenoxy-4-[p-(t-butyl) phenoxy]-6-[N-methyl-(p-(sodiumsulfo) phenyl amino]-s-trizaine.
2-(p-acetyl phenoxy)-4-(p-nitro phenoxy)-6-[p-(sodiumsulfo) phenyl amino]-s-triazine.

The potassium and lithium salts can also be similarly prepared from carbonate and hydroxides of potassium and lithium, respectively.

EXAMPLE 6

The compounds below are prepared by reacting one mole equivalent of cyanuric chloride with one mole equivalent of each of the appropriate phenols and phenylamines, in the manner previously described above, to give the corresponding 4 - chloro-2,6-disubstituted-s-triazine, which is then hydrolyzed in dilute alkali of solution.

2-phenoxy-4-hydroxy-6-[p-(sodiumsulfo) phenylamino]-s-triazine;

2-[p-(t-butyl) phenoxy]-4-hydroxy-6-[p'-(sodiumsulfo) phenylamino]-s-triazine; and 2-($\beta$-naphthoxy)-4-hydroxy-6-[p-(sodiumsulfo) phenylamino]-s-triazine.

The compounds below are prepared by reacting one mole equivalent of cyanuric chloride with 2 mole equivalents of the appropriate phenol in the manner previously described to give the corresponding 4-chloro-2,6-diphenoxy substituted-s-triazine, which is then hydrolyzed in dilute alkali:

2-phenoxy-4-hydroxy-6-[p-(sodiumsulfo) phenoxy]-s-triazine; and

2-[p-(t-butyl) phenoxy]-4-hydroxy-6-[p'-(sodiumsulfo) phenoxy]-s-triazine.

The compounds below are prepared by treating cyanuric chloride, first with the appropriate hydrocarbon by a Friedel-Crafts reaction, or with the corresponding arylmagnesium bromide viz. a Grignard reaction, to give the aryl substituted s-triazine, which is sulfonated and reacted with one mole of the appropriate phenol. The resultant product is then hydrolyzed in dilute alkali:

2-(p-acetophenoxy)-4-hydroxy-6-[3',5'-bis (sodiumsulfo) phenyl]-s-triazine;

2-phenoxy-4-hydroxy-6-[3'-(sodiumsulfo) phenyl]-s-triazine;

2-(p-phenylphenoxy)-4-hydroxy-6-[3'-(sodiumsulfo) phenyl]-s-triazine; and 2-(p-acetophenoxy)-4-hydroxy-6-[3'-sodiumsulfo) phenyl]-s-triazine.

EXAMPLE 7

2,4 - diphenoxy-6-[p-(lithiumsulfo) phenyl amino]-s-triazine is obtained by the following manner.

2,4-diphenoxy-6-[p-(sodiumsulfo) phenyl amino]-s-triazine (45.8 g.) is dissolved in hot water (700 ml.), there is, then, added an aqueous solution (700 ml.) of lithium chloride (210 g.).

The mixture is boiled for 30 minutes, the precipitate obtained is filtered, washed by a small amount of water, and dried at 100° C. 2,4-diphenoxy-6-[p-(lithiumsulfo) phenyl amino]-s-triazine can be purified by recrystallization from ethanol.

The corresponding potassium, barium, calcium, magnesium and manganese salts of the compounds in Example 1–6 are obtained in the same manner from acetate, chloride, sulfate or nitrate of the corresponding metals.

EXAMPLE 8

A mixture of $\epsilon$-caprolactam (5 kg.), 2,4-diphenoxy-6-[p-(sodiumsulfo) phenylamino] - s - triazine (300 g.), hexamethylene diamine (76 g.), sebacic acid (13 g.) and water (250 g.), was put into a 10 liter autoclave made of stainless steel and equipped with a stirrer. The air in the vessel was replaced by nitrogen gas. The mixture was heated under a pressure of 5 kg./cm.$^2$ at 255° C. for 4 hours. The pressure was slowly reduced to normal over a period of 1.5 hours. The autoclave was additionally held at 255° C. under a slow stream of nitrogen for 2 hours. All treatments were carried out with stirring at 28 r.p.m.

The obtained polyamide was collected as bristle from the bottom of the autoclave by increasing the nitrogen pressure. The bristle was cooled by passing through a cold water bath and was then cut into chips, which were washed with hot water for 6 hours to remove monomer. The chips were dried for 12 hours at 70° C. to obtain a polyamide having a relative viscosity of 2.58 (measured by using 1% solution in 96% sulfuric acid at 20° C.) and a melting point of 219° C. The chips were melt spun at 260° C. by the use of a conventional screw-type extruder provided with a 24 hole-spinneret (orifice diameter of 0.5 mm.) with a spinning speed of 200 m./min.

The resultant yarn was machine-drawn at a draw ratio of 3.6 and with a speed of 300 m./min. and was wound into pirns and was designated as "yarn I."

Another yarn was prepared as control yarn (designated as "yarn II") in a similar manner to that described above without using the triazine derivative and hexamethylenediamine.

A tricot fabric was prepared by using both yarns I and II (at the same weight ratio), and was cross-dyed as follows:

The fabric was scoured at 70° C. for one hour in a hot water bath containing 2 g./l. of Meiserine H 100 (refining agent available from Meisei Kagaku Kogyo K.K., Japan), and was dyed at the boil for one hour in a dyeing bath containing 5% of Diacryl Supra Black BSL (basic dyestuff available from Mitsubishi Kasei Kogyo K.K., Japan; Basic Black 8). The pH of the dyeing solution was adjusted to 4.5 with glacial acetic acid. This treatment resulted in yarn I being dyed deep black and the yarn II being stained only slightly. The dyed fabric was reductive-washed at 60° C. for 30 minutes in a bath containing 0.5 g./l. of Decroline soluble conc. (reducing agent available from Badische Anilin Sodafabrik A.G., Germany) and 0.5 g./l. of glacial acetic acid. The fabric was further dyed at the boil for one hour in a bath containing 1% of Supramine yellow GW (acid dyestuff available from Farbenfabriken Bayer A.G., Germany; Acid yellow 61). The bath was adjusted to a pH of 4.5 with glacial acetic acid. As a result, the yarn II was dyed yellow, while the colour of yarn I was not changed and remained the deep black colour. The fabric was soaped at 70° C. in a water bath containing 0.5 g./l. of Noigen HC (nonionic active surfactant available from Dai-ichi Kogyo Seiyaku K.K., Japan). There was obtained a fabric cross-dyed deep black and yellow.

EXAMPLE 9

An undyed tricot fabric was prepared and scoured in a similar manner to that described in Example 8, and was dyed at the boil for one hour in a bath containing 1% of Acilan Fast Navy Blue R (acid dyestuff available from Farbenfabriken Bayer A.G., Germany; Acid Blue 92). The dyed fabric was treated at 80° C. for 20 minutes in a bath containing 5% Nylon Fix TH (fixing agent available from Nihon Senka Kogyo K.K., Japan) and 2% glacial acetic acid and then at 40° C. for 30 minutes with 0.5 g./l. of Safanol (softener available from Sanyo Kasei Kogyo K.K., Japan).

Yarn I remained white, and the yarn II was dyed blue after this treatment.

EXAMPLE 10

A tricot fabric was prepared and scoured in a similar manner to that described in Example 8. The fabric was dyed at the boil for one hour in a dyeing bath containing 5% Diacryl Supra Black BSL (basic dyestuff available from Mitsubishi Kasei Kogyo K.K., Japan; Basic Black 8). The pH of the bath was adjusted to 4.5 by using glacial acetic acid and the fabric was then reductive-washed.

Yarn I dyed black and yarn II remained white.

EXAMPLE 11

A polyamide was prepared under similar polymerization conditions to those described in Example 8 from $\epsilon$-caprolactam (5 kg.), hexamethylenediamine (43 g.), titanium oxide (60 g.) as a delusterant and 2,4-diphenoxy-6-[p-(sodiumsulfo) phenylamino]-s-triazine (200 g.). No sebacic acid was used. Another polyamide was also prepared in a similar manner to that described in Example 8 from ε-caprolactam (5 kg.), titanium oxide (60 g.) and sebacic acid (13 g.). Triazine derivative and hexamethylenediamine were not used.

Two types of polyamide chips were separately made of these polyamides. They were non-uniformly blended with each other at a ratio of 1:1 by weight to give patches to the final product and were injection-moulded into buttons. The resultant buttons were dyed at 80° C. for 10 minutes in a dyeing bath containing 0.02 g./l. Diacryl Supra Green 2BL (basic dyestuff available from Mitsubishi Kasei Kogyo K.K., Japan; Basic Green 7) and 0.02 g./l. Supracen Red G (acid dyestuff available from Farbenfabriken Bayer A.G., Germany: Acid Red 37). The pH of the bath was adjusted to 4.5 with glacial acetic acid. The buttons were cross-dyed brilliant green and red in patches.

EXAMPLE 12

A polyamide yarn was prepared in a similar manner to that described in Example 8 by using ε-caprolactam (5 kg.) and 2,4-diphenoxy-6 - [p - (lithiumsulfo) phenylamine]-s-triazine (72 g.). After being scoured in a similar manner to that described in Example 8, the yarn was dyed for one hour in a dyeing bath, which was adjusted to a pH of 4.5 with glacial acetic acid, and contained 2% Diacryl Supra Green 2BL (basic dyestuff available from Mitsubishi Kasei Kogyo K.K., Japan; Basic Green 7), to dye the yarn a deep green. For comparison purposes, another polyamide yarn was prepared in a similar manner to that described above except that sebacic acid (33 g.) was substituted for the triazine derivative. The resultant yarn was hardly dyed by the similar treatment.

EXAMPLE 13

2,4-diphenoxy-6-[p-(sodiumsulfo)-phenylamino]-s - triazine (1790 g.) and hexamethylene diamine (460 g.) were heated at 275° C. in a nitrogen prepolymer, which was highly water-soluble. To the prepolymer were added ε-caprolactam (4 kg.) and water (200 g.). The mixture was polymerized in a similar manner to that described in Example 8 to give a polyamide, which was spun and drawn to give a yarn having a relative viscosity of 2.38 and a melting point of 203° C. The yarn had a high affinity for basic dyestuffs and was hydrophilic.

EXAMPLE 14

Into a 3 liter autoclave made of stainless steel was placed 1.25 kg. of an 80% aqueous solution of hexamethylenediammonium adipate (66 salt), to which was then added 2,4-diphenoxy-6-[p-(sodiumsulfo) phenylamino] - s - triazine (55.2 g.), hexamethylene diamine (12.4 g.) and water (200 g.). Air in the autoclave was replaced with nitrogen gas. The pressure and temperature were gradually elevated over a period of 2 hours to 18.5 kg./cm.$^2$ and 200° C., respectively. The temperature was then raised over a period of 2 hours to 245° C. at the same pressure to separate water as condensate. After this, the pressure was gradually reduced to normal over a period of 3 hours, while the temperature was raised to 270° C., at which point the system was allowed to stand for one hour under a slow stream of nitrogen gas. All treatments were carried out with stirring (28 r.p.m.).

There was obtained a polyamide, which was collected as bristle from the bottom of the autoclave by using nitrogen gas (pressure: 18.5 kg./cm.$^2$). The bristle was cooled with water and cut into chips, which were dried after being washed with hot water.

0.2% (w./w.) of magnesium stearate was added to the chips and the mixture was melt-spun by using a conventional screw-type extruder at 290° C. and was then drawn at a draw ratio of 3.9 to give a polyamide yarn (70 denier/ 24 filaments) having a relative viscosity of 2.72 (measured by using 1% solution in 96% sulfuric acid at 20° C.). The yarn was designated as "yarn I."

Another yarn designated as "yarn II" was prepared for comparison purposes in a similar manner to that described above except that no triazine derivative was used.

A tricot fabric was prepared in a similar manner to that described in Example 8, and was cross-dyed as follows:

The fabric was scoured at 70° C., and was immersed in a dyeing bath containing 1% Basacryl Red CL (basic dyestuff available from Badische Anilin Sodafabrik A.G., Germany; Basic Red 34) and 2 g./l. of Lyogen SMK (auxiliary agent available from Sandoz Ltd., Swiss).

The pH of the solution was adjusted to 5 with glacial acetic acid and the temperature was gradually raised to 60° C. A 1% aqueous solution of Acilan Fast Navy Blue R (acid dyestuff available from Farbenfabriken Bayer A.G., Germany; Acid Blue 92) was then added to the dyeing bath and the fabric was additionally dyed for one hour.

Yarns I and II were cross-dyed red and blue respectively.

EXAMPLE 15

A mixture of ε-caprolactam (20 g.), ε-aminocaproic acid (1 g.) and 2-phenoxy-4,6-bis [p-(sodiumsulfo) phenylamino]-s-triazine (0.06 g.) was polymerized at 255° C. in a similar manner to that described in Example 8 to give a polymer, which was melt-spun at 240° C. with a conventional melt spinning apparatus for laboratory use to give an undrawn yarn. The yarn was machine-drawn at a draw ratio of 3.0 in a conventional manner. The drawn yarn could easily be dyed by using Diacryl Supra Violet FRL (basic dyestuff available from Mitsubishi Kasei Kogyo K.K., Japan; Basic Violet 25), but could hardly be dyed with Solway Blue BN (acid dyestuff available from Imperial Chemical Industries Ltd., Great Britain; Acid Blue 45).

Another polymer was prepared in a similar manner to that described above except that sebacic acid (0.5 g.) was substituted for the triazine derivative. The obtained polymer was melt-spun and drawn in a similar manner to that described above to give a comparative yarn, which was hardly dyed with the above-mentioned basic dyestuff despite its dyeability for acid dyestuffs including those used in the above-mentioned examples.

EXAMPLES 16–19

Samples, each containing ε-caprolactam (1 kg.), ε-aminocaproic acid (50 g.), hexamethylene diamine (10.4 g.), and titanium oxide (3 g.), were prepared, and the triazine compounds shown in Table I were respectively added to each sample.

TABLE I

| Sample | Triazine derivative | Amount (g.) |
|---|---|---|
| 16 | 2,4-diphenoxy-6-[p-(magnesiumsulfo)phenylamino]-s-triazine. | 46 |
| 17 | do | 48 |
| 17 | do | 51.5 |
| 18 | 2-[p-(t-butyl)phenoxy]-4-hydroxy-6-[p'-(sodiumsulfo)phenylamino]-s-triazine. | 46 |
| 19 | 2,4-diphenoxy-6-[3'-(sodiumsulfo)phenyl]-s-triazine. | |

All samples were respectively treated as follows:

The sample was charged into a 3 liter autoclave made of stainless steel. Air in the autoclave was replaced by nitrogen gas, the temperature was gradually elevated, and the mass heated at 260° C. for 6 hours under a nitrogen stream with stirring (20 r.p.m.).

After the polymerization was completed, the reaction product was collected as bristles having a diameter of about 2 mm. from the bottom of the autoclave by increasing the pressure of the nitrogen. After being passed through a water bath, the bristles were cut into polyamide chips, which were dried after being washed well with water to remove monomer.

The chips were melt-spun and drawn in a similar manner to that described in Example 8 to give a yarn, which was dyed under the following conditions:

(I)

(a) Composition of the dyeing bath with basic dyestuff:

Sevron Blue B (available from E. I. du Pont de Nemours Co., U.S.A.; Basic Blue 21)

|  |  |
|---|---|
| percent | 0.5 |
| Sodium pyrophosphate do | 1.0 |
| Sodium primary phosphate | (¹) |
| (b) Temperature °C | 98 |
| (c) Time min | 60 |

¹ The amount was determined so as to give a pH of 7.

(II)

(a) Composition of the dyeing bath with acid dyestuff:

Solway Blue BN (available from Imperial Chemical Industries Co., Ltd., Great Britain; Acid Blue 45)

|  |  |
|---|---|
| percent | 0.5 |
| Glacial acetic acid m./l | 0.2 |
| (b) Temperature °C | 98 |
| (c) Time min | 60 |

It was observed that all samples exhibited good dyeabilities for basic dyestuff and inhibited dyeabilities for acid dyestuff.

EXAMPLE 20

To 27.7 g. of a 75% aqueous solution of hexamethylenediammonium sebacate (610 salt) were added 2,4-diphenoxy-6-[p-(sodiumsulfo) phenoxy]-s-triazine (0.56 g.) and hexamethylene diamine (0.14 g.). The mixture was put into a conventional test tube, which was then sealed and heated at 220° C. for 3 hours. The reaction product thus obtained was a white solid having a lower molecular weight than that of the final polyamide. The polymerizate was heated at 260° C. for 3 hours under a mild stream of nitrogen. The resultant polyamide having a relative viscosity of 2.85 was melt-spun by a conventional melt spinning apparatus for laboratory use and was then machine-drawn in a conventional manner.

The obtained yarn had a good dyeability for Sevron Orange CL (basic dyestuff available from E. I. du Pont de Nemours Co., Ltd., U.S.A.; Basic Orange 25) at pH 7, but was hardly dyed with Suminol Mill Yellow O (acid dyestuff available from Sumitomo Kagaku Kogyo K.K., Japan; Acid Yellow 38) at pH 7.

EXAMPLE 21

Polycaproamide chips of commercial grade (available from Nippon Rayon K.K., Japan) (1 kg.) were uniformly mixed with 2,4-diphenoxy-6-[p-(sodiumsulfo) phenylamino]-s-triazine (15 g.). The mixture was fed into a conventional screw-type extruder and was melt-spun under the following conditions:

Ratio of length to diameter of the extruder - L/D=10.
Spinning temperature _____ 270° C.
Spinning speed _____ 800 m./min.
Residence time of polymer in the extruder - 15 min.

The yarn was drawn at a draw ratio of 4.0 and with a speed of 500 m./min. The drawn yarn was designated as yarn I. Another yarn was prepared in a silmar manner to that described above without using triazine derivative and was designated as yarn II.

Both yarns had similar operational properties. Concentration of the terminal groups, relative viscosity and dyeabilities were determined and are shown in Table II.

TABLE II

|  | Yarn I | Yarn II |
|---|---|---|
| Concentration of terminal amino groups [1] | 0.0006 | 0.305. |
| Relative viscosity [2] | 2.70 | 2.71. |
| Dyeability for acid dyestuff [3] | White [5] | Blue. |
| Dyeability for basic dyestuff [4] | Deep blue | White.[5] |

[1] Millimoles per gram of polymer.
[2] 1% solution in 96% H₂SO₄ at 20° C.
[3] Dyestuff—Supranol Cyanin G (available from Farbenfabriken Bayer A.G., Germany; Acid Blue 90).
[4] Dyestuff—Sevron Blue B (available from E.I. duPont de Nemours & Co., U.S.A.; Basic Blue 21).
[5] The yarn dyed scarcely.

The yarn I had a lower concentration of the terminal amino groups in comparison with that of the yarn II. Accordingly, it was appreciated that the yarn I had an enhanced affinity for basic dyestuff and inhibited affinity for acid dyestuff.

EXAMPLES 22–25

Different triazine compounds shown in Table III below were respectively mixed with nylon 6 chips of commercial grade (available from Nippon Rayon K.K., Japan). The added amount was commonly 2.5% (w./w.). Respective yarns were prepared in a similar manner to that described in Example 21.

A control yarn was prepared in a similar manner to that described above except no triazine compound was used.

TABLE III

| Example: | Concentration of terminal amino groups | Dyeabilities for dyestuffs | |
|---|---|---|---|
|  |  | Acid | Basic |
| 22 | 0.0038 | White | Deep blue. |
| 23 | 0.0022 | do | Do. |
| 24 | 0.0041 | do | Do. |
| 25 | 0.0024 | do | Do. |
| Control | 0.0338 | Orange | White. |

NOTES (a) Dyestuffs used

Acid dyestuff _____ Xylene Fast Orange PO (available from Sandoz Ltd., Swiss; Acid Orange 28).

Basic dyestuff ____ Sevron Blue 2G (available from E. I. du Pont de Nemours & Co., U.S.A.: Basic Blue 22).

(b) Triazine compounds used

Example 22 _____ 2-phenoxy - 4,6 - bis[3'-sodiumsulfo) phenyl]-s-triazine.

Example 23 _____ 2,4-bis(β-naphthoxy) - 6 - [3'-(sodiumsulfo)phenyl]-s-triazine.

Example 24 _____ 2-phenoxy - 4 - [3'-(potassiumsulfo) phenyl] - 6 - [p-(potassiumsulfo)-phenylamino]-s-triazine.

Example 25 _____ 2 - phenoxy-4-[p-(t-butyl)phenoxy]-6-[3'-(potassiumsulfo) phenyl]-s-triazine.

EXAMPLE 26

Chips of polyhexamethylene adipamide (nylon 66) prepared in a similar manner to that described in Example 14 without using the triazine derivative (1 kg.) were mixed with 2,4 - diphenoxy-6-[p-(lithiumsulfo) phenoxy]-s-triazine (17 g.) and were melt-spun at 290 C. by means of a conventional extruder. The residence time of the polymer in the extruder was 15 minutes and the spinning speed was 800 m./min. The obtained yarn was drawn at a draw ratio of 4.0 to give a drawn yarn designated as yarn 1.

A control yarn (yarn II) was prepared in a similar manner to that described above except no triazine derivative was used.

Properties of the obtained yarns were determined by using Methylene Blue BX (basic dyestuff available from E. I. du Pont de Nemours Co., U.S.A.; Basic Blue 9) and Solway Blue BN (acid dyestuff available from Imperial Chemical Industries Ltd., Great Britain; Acid Blue 45) and are shown in Table IV:

TABLE IV

|  | Yarn I | Yarn II (control) |
|---|---|---|
| Concentration of terminal amino groups | 0.0006 | 0.0432. |
| Relative viscosity | 2.53 | 2.59. |
| Dyeabilities for: |  |  |
| Acid dyestuff | White | Blue. |
| Basic dyestuff | Deep blue | White. |

EXAMPLES 27–31

Different triazine derivatives were respectively used as follows:

Example
27—2,4 - diphenoxy - 6 - [p-magnesiumsulfo) phenylamino]-s-triazine
28—2-phenoxy - 4,6 - bis[3'-(magnesiumsulfo) phenyl]-s-triazine
29—2,4-bis-(β-naphthoxy) - 6 - [3'-(calciumsulfo) phenyl]-s-triazine
30—2-phenoxy - 4 - [3'-magnesiumsulfo) phenyl]-6-[p-(magnesiumsulfo) phenylamino]-s-triazine
31—2-phenoxy - 4 - [p-(t-butyl)phenoxy]-6-[3'-(bariumsulfo) phenyl]-s-triazine In these examples, different yarns respectively using different derivatives as well as a control yarn without the triazine derivative were prepared in a similar manner to that described in Example 21. All yarn samples had improved dyeabilities as shown in Table IV indicating the amount of the added triazine derivative (1), concentrations of the terminal amino groups (2), dyeabilities for acid dyestuff (3) and basic dyestuff (4). In this table, dyeabilities were determined by using Xylene Fast Orange PO (acid dyestuff available from Sandoz Ltd., Swiss; Acid Orange 28) and Sevron Blue 2G (basic dyestuc available from E. I. du Pont de Nemours Co., U.S.A.; Basic Blue 22).

TABLE V

| Item | 1[1] | 2 | 3 | 4 |
|---|---|---|---|---|
| Example: |  |  |  |  |
| 27 | 1.5 | 0.0008 | White | Deep blue. |
| 28 | 2.5 | 0.0046 | do | Do. |
| 29 | 2.5 | 0.0039 | do | Do. |
| 30 | 2.5 | 0.0051 | do | Do. |
| 31 | 2.5 | 0.0042 | do | Do. |
| Control |  | 0.0356 | Orange | White. |

[1] Amount of triazine derivative is indicated in percent by weight of polyamide.

EXAMPLE 32

To nylon 6 chips (1 kg.) of commercial grade (available from Nippon Rayon K. K., Japan) was mixed 2,4-diphenoxy-6-[2',4'-bis-(sodiumsulfo) phenylamino]-s-triazine (11 g.). The mixture was melt-spun by means of a conventional extruder under the following conditions:
Ratio of length to diameter of the extruder. L/D=15.

Spinning temperature _____ 265° C.
Spinning speed _____ 800 m./min.
Residence time of polymer in the extruder __ 13 min.

The yarn was then drawn at a draw ratio of 4.0 with a speed of 500 m./min. The drawn yarn was designated as yarn I.
For comparison purposes, a control yarn (yarn II) was prepared in a similar manner to that described above except that no triazine derivative was used. Properties of the yarns are shown in Table VI.

TABLE VI

|  | Yarn I | Yarn II |
|---|---|---|
| Concentration of terminal amino groups | 0.0004 | 0.0298. |
| Relative viscosity | 2.68 | 2.69. |
| Dyeability for: |  |  |
| Acid dyestuff [1] | White | Deep blue. |
| Basic dyestuff [2] | Blue | White. |

[1] Supramine Blue GW (acid dyestuff available from Farbenfabriken Bayer, Germany; Acid Blue 215).
[2] Sevron Blue B (available from E. I. du Pont de Nemours Co., U.S.A.; Basic Blue 21).

EXAMPLES 33–34

Nylon 6 chips of commercial grade (available from Nippon Rayon K.K., Japan) was mixed with different triazine derivatives and was melt-spun by means of a conventional extruder under the following conditions, respectively:

Ratio of length to diameter of the extruder _____ L/D=20.
Spinning temperature _____ 265° C.
Spinning speed _____ 600 m./min.
Residence time of polymer in the extruder _____ 15 min.

The triazine compounds 2-phenoxy-4-hydroxy-6-[p-(sodiumsulfo)-phenylamine]-s-triazine and 2-phenoxy-4-hydroxy-6-[p-(sodiumsulfo)-phenoxy]-s-triazine were respectively used. The yarns obtained from Examples 33 and 34 were respectively designated as yarn I and yarn II. Without addition of the triazine derivative, a control yarn was prepared in a similar manner to that described above and was designated as yarn III.

Table VII showing the properties of yarns I, II and III, the concentration of the terminal amino groups, relative viscosity, dyeability for acid dyestuff and dyeability for basic dyestuff are respectively designated as items A, B, C and D. In the examples, Supramine Blue GW (acid dyestuff available from Farbenfabriken Bayer A.G., Germany; Acid Blue 215) and Diacryl Supra Yellow 5RL (basic dyestuff available from Mitsubishi Kaisei Kogyo K.K., Japan; Basic Yellow 34) were used for determining dyeabilities.

TABLE VII

|  | Yarn I | Yarn II | Yarn III |
|---|---|---|---|
| A | 0.001 | 0.001 | 0.038. |
| B | 2.60 | 2.65 | 2.69. |
| C | White | White | Blue. |
| D | Yellow | Yellow | White. |

EXAMPLE 35

Nylon 66 chips (1 kg.) prepared in a similar manner to that described in Example 14 without using the triazine derivative were uniformly mixed with 2-phenoxy-4-[p-(t-butyl) phenoxy]-6-[p'-(potassiumsulfo)-phenylamino]-s-triazine (18 g.), and were melt-spun by means of a conventional extruder under the following conditions:

Ratio of length to diameter of the extruder _____ L/D=20.
Spinning temperature _____ 290° C.
Spinning speed _____ 800 m./min.
Residence time of polymer in the extruder _____ 15 min.

The yarn, which was drawn at a draw ratio of 4.0 and with a speed of 500 m./m., was designated as yarn I. Without addition of the triazine derivative, a control yarn (yarn II) was prepared in a similar manner to that described above.

In Table VIII below, showing the properties of the yarns I and II, the concentration of the terminal amino groups, relative viscosity, dyeabilities for acid and basic dyestuffs are designated as A, B, C and D respectively. Dyeabilities were determined by using Solway Blue BN (acid dyestuff available from Imperial Chemical Industries Ltd., Great Britain; Acid Blue 45) and Methylene Blue BX (basic dyestuff available from E. I. du Pont de Nemours Co., U.S.A.; Basic Blue 9).

TABLE VIII

|   | Yarn I | Yarn II |
|---|--------|---------|
| A | 0.0007 | 0.0532. |
| B | 2.41   | 2.38.   |
| C | White  | Blue.   |
| D | Deep blue | White. |

EXAMPLES 36–39

Different triazine compounds shown in the table below were respectively admixed with nylon 6 chips (1 kg.) of commercial grade (available from Nippon Rayon K.K., Japan). Each mixture was melt-spun and drawn under the following conditions:

Ratio of length to diameter of the extruder _____ L/D=20.
Spinning temperature _____ 265° C.
Spinning speed _____ 550 m./min.
Residence time of polymer in the extruder _____ 18 min.
Draw ratio _____ 3.6.
Draw speed _____ 470 m./min.

Four types of the drawn yarn thus obtained were respectively compared with a control yarn which was prepared in a similar manner to that described above without using any triazine derivative.

In Examples 36–39, as triazine derivatives, 2-phenoxy-4 - (p-nitrophenoxy)-6-[N-methyl-($\beta$-lithiumsulfo)-ethylamino]-s-triazine; 2,4-bis (p-chlorophenoxy-6-[p'-(lithiumsulfo) phenylamino] - s - triazine; 2,4-bis (p-nitrophenoxy) - 6 - [2',4' - bis (magnesiumsulfo) phenoxy]-s-triazine; and 2-(p-phenylphenoxy)-4-hydroxy-6-[3'-manganesesulfo)-phenyl]-s-triazine were respectively used. The results are given in Table IX below.

Dyeabilities for acid dyestuff and for basic dyestuff were respectively determined by using Suminol Mill Red PG (acid dyestuff available from Sumitomo Kagaku Kogyo K.K., Japan; Acid Red 85) and Diacryl Supra Violet FRL (basic dyestuff available from Mitsubishi Kasei Kogyo K.K., Japan; Basic Violet 25).

TABLE IX

|   | 36 | 37 | 38 | 39 | Control |
|---|----|----|----|----|---------|
| Concentrations of terminal amino groups. | 0.0029 | 0.0039 | 0.0041 | 0.0033 | 0.039. |
| Dyeabilities for: |   |   |   |   |   |
| Acid dyestuff | White | 0.0039 | 0.0041 | 0.0033 | Red. |
| Basic dyestuff | Deep violet. | 0.0039 | 0.0041 | 0.0033 | White. |
| Added amount of triazine compound. | 1.92 | 2.23 | 2.85 | 2.07 | 0. |

NOTE.—Added amount of triazine compound is indicated as percent (w./w.).

EXAMPLES 40–42

In Examples 40–42, three types of triazine derivatives, i.e., 2-(p-acetophenoxy)-4-hydroxy-6-[3'-(potassiumsulfo)phenyl]-s-triazine; 2,4-bis (p-acetophenoxy)-6-[p-(sodiumsulfo)-phenylamino]-s-triazine; and 2-phenoxy-4-(p-methylphenoxy) - 6 - [p-(manganesesulfo)-phenylamino]-s-triazine were respectively added to nylon 66 chips, prepared in a similar manner to that described in Example 14 without using the triazine derivative, which were then melt-spun by means of a conventional extruder and drawn under the following conditions:

Ratio of length to diameter of the extruder _ L/D=20.
Spinning temperature _____ 285° C.
Spinning speed _____ 600 m./min.
Residence time of polymer in the extruder _ 16 min.
Draw ratio _____ 4.1.
Draw speed _____ 500 m./min.

A control yarn was prepared in a similar manner to that described above without using any triazine derivative.

The amount of the added triazine derivative, concentration of the terminal amino groups, dyeabilities for acid dyestuff and for basic dyestuff were respectively designated as items A, B, C and D in Table X below. The dyeabilities were determined by using Kayanol Mill Green 5GW (acid dyestuff available from Nippon Kayaku Kogyo K.K., Japan; Acid Green 28) and Maxilon Yellow 3GL (basic dyestuff available from Geigy Ltd., Swiss; Basic Yellow 18).

TABLE X

|   | 40 | 41 | 42 | Control |
|---|----|----|----|---------|
| A | 1.85% | 2.20% | 2.63% | Zero. |
| B | 0.0019 | 0.0013 | 0.0016 | 0.046. |
| C | White | White | White | Green. |
| D | Yellow | Yellow | Yellow | White. |

EXAMPLE 43

Nylon 6 chips of commercial grade (available from Nippon Rayon Co., Ltd., Japan) (1 kg.) were uniformly mixed with 2,4-diphenoxy-6-[4-(sodiumsulfo)-naphthylamino]-s-triazine (20 g.).

The mixture was fed into a conventional screw-type extruder and was melt-spun under the following conditions:

Ratio of length to diameter of the extruder _ L/D=22.
Spinning temperature _____ 265° C.
Spinning speed _____ 800 m./min.
Residence time of polymer in the extruder _ 17 min.

The yarn was drawn at a draw ratio of 4.2 and with a speed of 500 m./min. The drawn yarn was designated as yarn I. Another yarn was prepared in a similar manner to that described above without using triazine derivatives and was designated as yarn II.

Both yarns had similar operational properties. Concentration of the terminal groups, relative viscosity and dyeabilities were determined and are shown in Table XI.

TABLE XI

|   | Yarn I | Yarn II |
|---|--------|---------|
| Concentration of terminal amino groups | 0.0012 | 0.0306. |
| Relative viscosity | 2.66 | 2.70. |
| Dyeability for: |   |   |
| Acid dyestuff | Almost white | Blue. |
| Basic dyestuff | Deep blue | White. |

EXAMPLE 44

Nylon 66 chips (1 kg.) were uniformly mixed with 2,4-diphenoxy - 6 - [$\gamma$-(sodiumsulfo) propylamino]-s-triazine (18 g.), which was obtained from $\gamma$-aminopropane sulfonic acid in a similar way above mentioned.

The mixture was fed into a conventional screw-type extruder and was melt-spun under the following conditions:

Ratio of length to diameter of the extruder _ L/D=22.
Spinning temperature _____ 285° C.
Spinning speed _____ 800 m./min.
Residence time of polymer in the extruder _ 17 min.

The yarn was drawn at a draw ratio of 4.2 and with a speed of 500 m./min. The drawn yarn was designated as yarn I. Another yarn was prepared in a similar manner to that described above without using triazine derivatives and was designated as yarn II.

Both yarns had similar operational properties. Concentration of the terminal groups, relative viscosity and dyeabilities were determined and are shown in Table XII below:

TABLE XII

|   | Yarn I | Yarn II |
|---|--------|---------|
| Concentration of terminal amino groups | 0.0018 | 0.0411. |
| Relative viscosity | 2.40 | 2.51. |
| Dyeability for: |   |   |
| Acid dyestuff | White | Blue. |
| Basic dyestuff | Deep blue | White. |

What is claimed is:
1. A compound selected from the group having the formula:

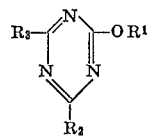

wherein:

R₁ is selected from the group consisting of phenyl, nitrophenyl, chlorophenyl, acetoxyphenyl, lower alkyl substituted phenyl, biphenyl and naphthyl;

R₂ is selected from the group consisting of:

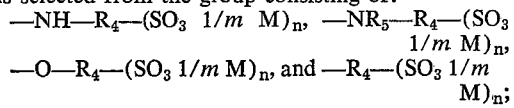

where $n$ is 1 or 2,

R₄ is phenylene, lower alkyl phenylene, or alkylene of up to 6 carbon atoms when $n$ is 1 and 1,3,5-phenyl group when $n$ is 2;

R₅ is alkyl of up to 5 carbon atoms;

M is an alkali metal, an alkaline earth metal or manganese, $m$ is 1 when M is an alkali metal and 2 when M is an alkaline earth metal or manganese; and R₃ is selected from the group consisting of OH, OR₁ and R₂.

2. The compound of claim 1 which is 2,4-diphenoxy-6-[p-(sodiumsulfo)phenylamino]-s-triazine.

3. The compound of claim 1 which is 2,4-diphenoxy-6-[p-(potassiumsulfo)phenylamino]-s-triazine.

4. The compound of claim 1 which is 2,4-diphenoxy-6-[p-(lithiumsulfo)phenylamino]-s-triazine.

5. The compound of claim 1 which is 2,4-diphenoxy-6-[2',4'-bis(sodiumsulfo)phenylamino]-s-triazine.

6. The compound of claim 1 which is 2,4-diphenoxy-6-[2',4'-bis(lithiumsulfo)phenylamino]-s-triazine.

7. The compound of claim 1 which is 2,4-bis(p-phenylphenoxy)-6-[p'-(sodiumsulfo)phenylamino]-s-triazine.

8. The compound of claim 1 which is 2,4-bis(β-naphthoxy)-6-[p-(sodiumsulfo)phenylamino]-s-triazine.

9. The compound of claim 1 which is 2-phenoxy-4,6-bis-[p-(sodiumsulfo)phenylamino]-s-triazine.

10. The compound of claim 1 which is 2-phenoxy-4,6-bis[p-(potassiumsulfo)phenylamino]-s-triazine.

11. The compound of claim 1 which is 2-phenoxy-4,6-bis[p-(lithiumsulfo)phenylamino]-s-triazine.

12. The compound of claim 1 which is 2,4-diphenoxy-6-[4'-(sodiumsulfo)naphthylamino]-s-triazine.

References Cited

FOREIGN PATENTS 1,574,077   7/1969   France _____ 260—242

OTHER REFERENCES

Thurston et al., J. Am. Chem. Soc., vol. 73, pp. 2981–3006 (1951).

Ishikawa et al., J. Synthetic Org. Chem., Japan, vol. 25, pp. 55–65 (1967).

Matsui, J. Syn. Org. Chem., Japan, vol. 18, p. 175–181 (1960).

Nakamura et al., J. Chem. Soc., Japan, vol. 68, pp. 714–717 (1965).

Dudley, J. Am. Chem. Soc., vol. 73, p. 3007–08 (1951).

HARRY I. MOATZ, Primary Examiner

U.S. Cl. X.R.

8—1 E, 178 R; 260—39 P, 248, 249.5, 249.6